(12) United States Patent
Huntington et al.

(10) Patent No.: US 9,618,261 B2
(45) Date of Patent: Apr. 11, 2017

(54) POWER GENERATION AND LNG PRODUCTION

(71) Applicants: Richard A. Huntington, Houston, TX (US); Stanley O. Uptigrove, Kuala Lumpur (MY); Russell H. Oelfke, Houston, TX (US); O. Angus Sites, Spring, TX (US)

(72) Inventors: Richard A. Huntington, Houston, TX (US); Stanley O. Uptigrove, Kuala Lumpur (MY); Russell H. Oelfke, Houston, TX (US); O. Angus Sites, Spring, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 444 days.

(21) Appl. No.: 14/182,048

(22) Filed: Feb. 17, 2014

(65) Prior Publication Data

US 2014/0250911 A1    Sep. 11, 2014

Related U.S. Application Data

(60) Provisional application No. 61/775,157, filed on Mar. 8, 2013.

(51) Int. Cl.
*F25J 1/00* (2006.01)
*F02C 3/34* (2006.01)
(Continued)

(52) U.S. Cl.
CPC .......... *F25J 1/0022* (2013.01); *F01D 15/005* (2013.01); *F01K 5/02* (2013.01); *F02C 3/34* (2013.01);
(Continued)

(58) Field of Classification Search
CPC  F25J 1/0022; F25J 1/025; F25J 1/0281; F25J 1/0221; F25J 1/0288; F25J 1/0268;
(Continued)

(56) References Cited

U.S. PATENT DOCUMENTS 2,488,911 A   11/1949   Hepburn et al.
2,884,758 A   5/1959   Oberle
(Continued)

FOREIGN PATENT DOCUMENTS

CA   2231749   9/1998
CA   2645450   9/2007
(Continued)

OTHER PUBLICATIONS

Ahmed, S. et al. (1998) "Catalytic Partial Oxidation Reforming of Hydrocarbon Fuels," *1998 Fuel Cell Seminar*, Nov. 16-19, 1998, 7 pgs.
(Continued)

*Primary Examiner* — John C Hong
(74) *Attorney, Agent, or Firm* — ExxonMobil Upstream Research Company Law Department

(57) ABSTRACT

The present techniques are directed to a system and method for generating power and producing liquefied natural gas (LNG). The system includes a power plant configured to generate power, wherein an exhaust gas from the power plant provides a gas mixture including nitrogen and carbon dioxide. The system also includes a dehydration system configured to dehydrate the gas mixture to generate a nitrogen refrigerant stream and a refrigeration system configured to produce LNG from a natural gas stream using the nitrogen refrigerant stream.

30 Claims, 6 Drawing Sheets

(51) Int. Cl.
  *F01K 23/10* (2006.01)
  *F25J 1/02* (2006.01)
  *F01D 15/00* (2006.01)
  *F02C 6/18* (2006.01)
  *F01K 5/02* (2006.01)

(52) U.S. Cl.
  CPC ............... *F02C 6/18* (2013.01); *F25J 1/005* (2013.01); *F25J 1/0072* (2013.01); *F25J 1/0204* (2013.01); *F25J 1/025* (2013.01); *F25J 1/0221* (2013.01); *F25J 1/0268* (2013.01); *F25J 1/0281* (2013.01); *F25J 1/0288* (2013.01); *F01K 23/10* (2013.01); *F05D 2220/72* (2013.01); *F05D 2260/61* (2013.01); *F25J 2210/42* (2013.01); *F25J 2230/20* (2013.01); *F25J 2240/44* (2013.01); *F25J 2240/90* (2013.01); *F25J 2260/80* (2013.01); *F25J 2270/904* (2013.01); *Y02E 20/16* (2013.01); *Y02E 20/326* (2013.01)

(58) Field of Classification Search
  CPC   F25J 1/0072; F25J 1/0204; F25J 1/005; F25J 2270/904; F25J 2230/20; F25J 2260/80; F25J 2210/42; F25J 2240/90; F25J 2240/44; F01K 5/02; F01K 23/10; F01D 15/005; F02C 6/18; F02C 3/34; Y02E 20/16; F05D 2260/61; F05D 2220/72
  See application file for complete search history.

(56)     References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |

(56) References Cited

U.S. PATENT DOCUMENTS

| | | |
|---|---|---|
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |

(56) References Cited

U.S. PATENT DOCUMENTS

| | | |
|---|---|---|
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |

(56) References Cited

U.S. PATENT DOCUMENTS

| | | |
|---|---|---|
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |

(56) References Cited

U.S. PATENT DOCUMENTS

| | | |
|---|---|---|
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | Elkady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | Elkady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0111948 A1* | 5/2013 | Higginbotham ..... B01D 53/002 62/617 |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0130542 A1* | 5/2014 | Brown ................ F25J 3/0214 62/612 |

FOREIGN PATENT DOCUMENTS

| | | |
|---|---|---|
| EP | 0770771 | 5/1997 |
| GB | 0776269 | 6/1957 |
| GB | 2117053 | 10/1983 |
| WO | WO9906674 | 2/1999 |
| WO | WO9963210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | PCT/RU2013/000162 | 2/2013 |
| WO | PCT/US13/036020 | 4/2013 |
| WO | WO2013147632 | 10/2013 |
| WO | WO2013147633 | 10/2013 |
| WO | WO2013155214 | 10/2013 |
| WO | WO2013163045 | 10/2013 |

OTHER PUBLICATIONS

Air Separation Technology Ion Transport Membrane—Air Products 2008.

Air Separation Technology Ion Transport Membrane—Air Products 2011.

Anderson, R. E. (2006) "Durability and Reliability Demonstration of a Near-Zero-Emission Gas-Fired Power Plant," *California Energy Comm.*, CEC 500-2006-074, 80 pgs.

Baxter, E. et al. (2003) "Fabricate and Test an Advanced Non-Polluting Turbine Drive Gas Generator," *U.S. Dept. of Energy, Nat'l Energy Tech. Lab.*, DE-FC26-00NT 40804, 51 pgs.

Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.

BP Press Release (2006) "BP and Edison Mission Group Plan Major Hydrogen Power Project for California," Feb. 10, 2006, www.bp.com/hydrogenpower, 2 pgs.

Bryngelsson, M. et al. (2005) "Feasibility Study of CO2 Removal From Pressurized Flue Gas in a Fully Fired Combined Cycle—The Sargas Project," KTH—Royal Institute of Technology, Dept. of Chemical Engineering and Technology, 9 pgs.

(56) References Cited

OTHER PUBLICATIONS

Clark, Hal (2002) "Development of a Unique Gas Generator for a Non-Polluting Power Plant," *California Energy Commission Feasibility Analysis*, P500-02-011F, Mar. 2002, 42 pgs.
Foy, Kirsten et al. (2005) "Comparison of Ion Transport Membranes"—*Fourth Annual Conference on Carbon Capture and Sequestration, DOE/NETL*; May 2005, 11 pages.
Cho, J. H. et al. (2005) "Marrying LNG and Power Generation," *Energy Markets*; Oct./Nov. 2005; 10, 8; ABI/INFORM Trade & Industry, p. 28.
Ciulia, Vincent "Auto Repair. How the Engine Works," About.com. 2001-2003.
Corti, A. et al. (1988) "Athabasca Mineable Oil Sands: The RTR/Gulf Extraction Process Theoretical Model of Bitumen Detachment," $4^{th}$ *UNITAR/UNDP Int'l Conf. on Heavy Crude and Tar Sands Proceedings*, v.5, paper No. 81, Edmonton, AB, Canada, Aug. 7-12, 1988, pp. 41-44.
Cryogenics. Science Clarified. 2012. http://www.scienceclarified.com/Co-Di/Cryogenics.html.
Defrate, L. A. et al. (1959) "Optimum Design of Ejector Using Digital Computers" *Chem. Eng. Prog. Symp. Ser.*, 55 (21) pp. 46.
Ditaranto, M. et al. (2006) "Combustion Instabilities in Sudden Expansion Oxy-Fuel Flames," *ScienceDirect, Combustion and Flame*, v.146, Jun. 30, 2006, pp. 493-51.
Elwell, L. C. et al. (2005) "Technical Overview of Carbon Dioxide Capture Technologies for Coal-Fired Power Plants," *MPR Associates, Inc.*, Jun. 22, 2005, 15 pgs.
Eriksson, Sara (2005) Licentiate Thesis, KTH—"Development of Methane Oxidation Catalysts for Different Gas Turbine Combustor Concepts." *The Royal Institute of Technology, Department of Chemical Engineering and Technology, Chemical Technology*, Stockholm Sweden, p. 22.
Ertesvag, I. S. et al. (2005) "Energy Analysis of a Gas-Turbine Combined-Cycle Power Plant With Precombustion $CO_2$ Capture," *Elsevier*, 2004 pp. 5-39.
Evulet, Andrei T. et al. (2009) "Application of Exhaust Gas Recirculation in a DLN F-Class Combustion System for Post Combustion Carbon Capture" *ASME J. Engineering for Gas Turbines and Power*, v131, May 2009.
Evulet, Andrei T. et al. (2009) "On the Performance and Operability of GE's Dry Low Nox Combustors utilizing Exhaust Gas Recirculation for Post-Combustion Carbon Capture" *Energy Procedia*, pp. 3809-3816.
http://www.turbineinletcooling.org/resources/papers/CTIC_WetCompression_Shepherd_ASMETurboExpo2011.pdf , Shepherd, IGTI 2011—CTIC Wet Compression, Jun. 8, 2011.
Luby, P. et al. (2003) "Zero Carbon Power Generation: IGCC as the Premium Option," *Powergen International*, 19 pgs.
MacAdam, S. et al. (2008) "Coal-Based Oxy-Fuel System Evaluation and Combustor Development," *Clean Energy Systems, Inc.* 6 pgs.
Morehead, H. (2007) "Siemens Global Gasification and IGCC Update," *Siemens, Coal-Gen*, Aug. 3, 2007, 17 pgs.
Nanda, R. et al. (2007) "Utilizing Air Based Technologies as Heat Source for LNG Vaporization," presented at the $86^{th}$ Annual convention of the *Gas Processors of America* (GPA 2007), Mar. 11-14, 2007, San Antonio, TX.
Reeves, S. R. (2001) "Geological Sequestration of $CO_2$ in Deep, Unmineable Coalbeds: An Integrated Research and Commercial-Scale Field Demonstration Project," *SPE* 71749,10 pgs.
Reeves, S. R. (2003) "Enhanced Coalbed Methane Recovery," *SPE* 101466-DL, 8 pgs.
Richards, G. A. et al. (2001) "Advanced Steam Generators," *National Energy Technology Laboratory*, 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the *Gas Processors of America* (GPA 2006), Grapevine, Texas, Mar. 5-8, 2006.
Snarheim, D. et al. (2006) "Control Design for a Gas Turbine Cycle With $CO_2$ Capture Capabilities," *Modeling, Identification and Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. Of Science and Technology*, 9 pgs.
vanHemert, P. et al. (2006) "Adsorption of Carbon Dioxide and a Hydrogen-Carbon Dioxide Mixture," *Intn'l Coalbed Methane Symposium (Tuscaloosa, AL)* Paper 0615, 9 pgs.
Zhu, J. et al. (2002) "Recovery of Coalbed Methane by Gas Injection," *SPE* 75255, 15 pgs.
U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.

\* cited by examiner

500

POWER GENERATION AND LNG PRODUCTION

CROSS REFERENCE TO RELATED APPLICATIONS

This application claims the priority benefit of U.S. Patent Application 61/775,157 filed Mar. 8, 2013 entitled POWER GENERATION AND LNG PRODUCTION, the entirety of which is incorporated by reference herein.

FIELD OF THE INVENTION

The present disclosure relates generally to power generation and liquefied natural gas (LNG) production. More particularly, the present disclosure relates to systems and methods for integrating power generation with LNG production.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

A Brayton cycle engine commonly known as a gas turbine engine often has a turbine compressor that is mechanically linked to an expander turbine through a shaft. The turbine compressor can be used to compress a flow of air ingested by the turbine compressor. The compressed air is then flowed to a combustor. In the combustor, fuel is injected and ignited to create a continuous flame. The high pressure exhaust gases from the flame are flowed into the expander turbine, which generates mechanical energy from the exhaust gas as it expands. Such a gas turbine engine can be adapted to combust fuel at near stoichiometric conditions with exhaust gas recirculation (EGR) and may be referred to as an ultra-low emissions technology (ULET) engine.

The exhaust gas may include a mixture of nitrogen, carbon dioxide, water, and any number of other gaseous components. A portion of the exhaust gas may be extracted from the engine or EGR system and, following some treatment, may be injected into a reservoir for pressure maintenance or enhanced hydrocarbon recovery from a subterranean reservoir or for carbon sequestration. For some applications, at least a portion of the nitrogen product from the extracted exhaust gas is not used for reservoir pressure maintenance or enhanced hydrocarbon recovery. Therefore, at least a portion of the nitrogen product may be vented to the atmosphere after expansion and power recovery. For some current applications, the excess nitrogen product is used in conjunction with a high temperature expansion process to increase the amount of power recovered from the system. However, the excess nitrogen product may also be used for a variety of other purposes.

U.S. Pat. No. 4,271,664 to Earnest discloses a turbine engine with exhaust gas recirculation. The engine has a main power turbine operating on an open-loop Brayton cycle. The air supply to the main power turbine is furnished by a compressor independently driven by the turbine of a closed-loop Rankine cycle which derives heat energy from the exhaust of the Brayton turbine. A portion of the exhaust gas is recirculated into the compressor inlet during part-load operation. However, no additional uses are disclosed for the recycled exhaust.

U.S. Pat. No. 6,412,302 to Foglietta et al. describes a process for producing a liquefied natural gas stream. The process includes cooling at least a portion of a pressurized natural gas feed stream by heat exchange contact with first and second expanded refrigerants that are used in independent refrigeration cycles. The first expanded refrigerant is selected from methane, ethane, and treated and pressurized natural gas, while the second expanded refrigerant is nitrogen. However, generation of the second expanded refrigerant from exhaust gas including nitrogen is not disclosed.

SUMMARY

An exemplary embodiment of the present techniques provides a system for generating power and producing liquefied natural gas (LNG). The system includes a power plant configured to generate power, wherein an exhaust gas from the power plant provides a gas mixture including nitrogen and carbon dioxide. The system also includes a dehydration system configured to dehydrate the gas mixture to generate a nitrogen refrigerant stream and a refrigeration system configured to produce LNG from a natural gas stream using the nitrogen refrigerant stream.

Another exemplary embodiment provides a method for generating power and producing liquefied natural gas (LNG). The method includes producing power via a power plant, wherein an exhaust gas from the power plant provides a gas mixture including nitrogen and carbon dioxide. The method also includes generating a nitrogen refrigerant stream from the gas mixture and producing LNG from a natural gas stream using the nitrogen refrigerant stream.

Another exemplary embodiment provides a system for producing liquefied natural gas (LNG) using nitrogen recovered from a combined cycle power plant. The system includes an expander turbine configured to provide mechanical energy by extracting energy from a gas mixture exiting a combustor, wherein the gas mixture includes nitrogen and carbon dioxide. The system also includes a heat recovery steam generator (HRSG) configured to generate steam by heating a boiler with the gas mixture from the expander turbine, a steam turbine configured to provide mechanical energy by extracting energy from the steam generated by the HRSG, and a generator configured to generate electricity from the mechanical energy provided by the expander turbine and the steam turbine. The system further includes a dehydration system configured to dehydrate the gas mixture, generating a nitrogen refrigerant stream, and a refrigeration system configured to produce LNG from a natural gas stream using the nitrogen refrigerant stream.

BRIEF DESCRIPTION OF THE DRAWINGS

The advantages of the present techniques are better understood by referring to the following detailed description and the attached drawings, in which.

DETAILED DESCRIPTION

Figure 1:
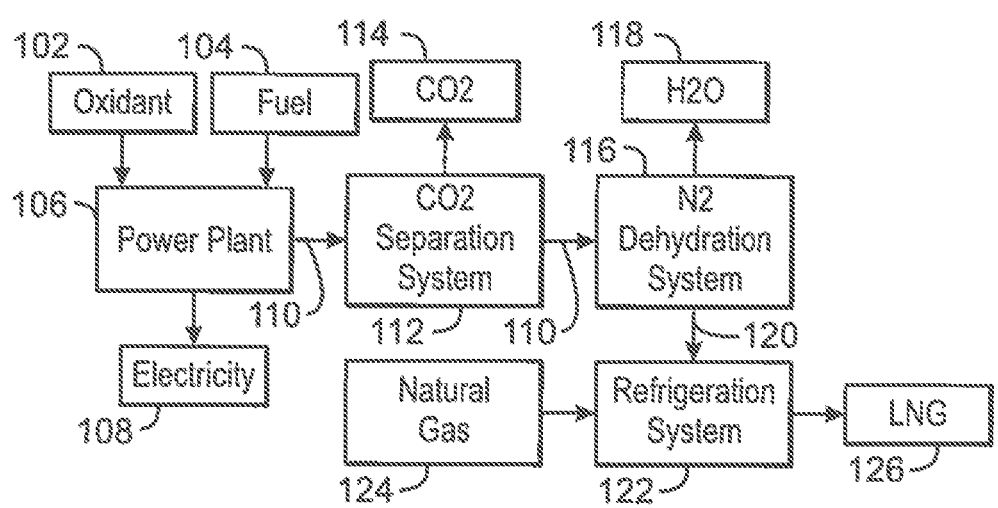
FIG. 1 is a block diagram of a system for power generation and LNG production.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described herein, but rather, include all alternatives, modifications, and equivalents falling within the true spirit and scope of the appended claims.

At the outset, for ease of reference, certain terms used in this application and their meanings as used in this context are set forth. To the extent a term used herein is not defined herein, it should be given the broadest definition persons in the pertinent art have given that term as reflected in at least one printed publication or issued patent. Further, the present techniques are not limited by the usage of the terms shown herein, as all equivalents, synonyms, new developments, and terms or techniques that serve the same or a similar purpose are considered to be within the scope of the present claims.

A "combined cycle power plant" is generally the combination of an open Brayton Cycle and a Rankine cycle. Combined cycle power plants typically use both steam and gas turbines to generate power, although other working fluids besides water and steam may be used in the Rankine cycle. The combined cycle gas/steam power plants generally have a higher energy conversion efficiency than gas or steam only plants. A combined cycle plant's efficiencies can be as high as 50% to 60% of a lower heating value (LHV). The higher combined cycle efficiencies result from synergistic utilization of a combination of the gas turbine with the steam turbine. Typically, combined cycle power plants utilize heat from the gas turbine exhaust to boil water to generate steam. The boilers in typical combined cycle plants can be referred to as heat recovery steam generator (HRSG). The steam generated is utilized to power a steam turbine in the combined cycle plant. The gas turbine and the steam turbine can be utilized to separately power independent generators, or in the alternative, the steam turbine can be combined with the gas turbine to jointly drive a single generator via a common drive shaft.

As used herein, a "compressor" includes any type of equipment designed to increase the pressure of a fluid or working fluid, and includes any one type or combination of similar or different types of compression equipment. A compressor may also include auxiliary equipment associated with the compressor, such as motors, and drive systems, among others. The compressor may utilize one or more compression stages, for example, in series. Illustrative compressors may include, but are not limited to, positive displacement types, such as reciprocating and rotary compressors for example, and dynamic types, such as centrifugal and axial flow compressors, for example. For example, a compressor may be a first stage in a gas turbine engine, as discussed in further detail herein.

As used herein, "cooling" broadly refers to lowering and/or dropping a temperature and/or internal energy of a substance, such as by any suitable amount. Cooling may include a temperature drop of at least about 1 degree Celsius (° C.), at least about 5° C., at least about 10° C., at least about 15° C., at least about 25° C., at least about 50° C., at least about 100° C., and/or the like. The cooling may use any suitable heat sink, such as steam generation, hot water heating, cooling water, air, refrigerant, other process streams (integration), and combinations thereof. One or more sources of cooling may be combined and/or cascaded to reach a desired outlet temperature. The cooling step may use a cooling unit with any suitable device and/or equipment. According to one embodiment, cooling may include indirect heat exchange, such as with one or more heat exchangers. Heat exchangers may include any suitable design, such as shell and tube, plate and frame, counter current, concurrent, extended surface, and/or the like. In the alternative, the cooling may use evaporative (heat of vaporization) cooling and/or direct heat exchange, such as a liquid sprayed directly into a process stream.

"Cryogenic temperature" refers to a temperature that is about −50° C. or below.

A "diluent" is a gas used to lower the concentration of an oxidant fed to a gas turbine to combust a fuel, a gas used to lower the concentration of a fuel fed to a gas turbine that is combusted with an oxidant, a gas used to reduce the temperature of the products of combustion of a fuel and an oxidant fed to a gas turbine or a combination of these. The diluent may be an excess of nitrogen, carbon dioxide, combustion exhaust, or any number of other gases. In embodiments, the diluent may also provide cooling to a combustor.

"Enhanced oil recovery" or "EOR" refers to processes for enhancing the recovery of hydrocarbons from subterranean reservoirs by the introduction of materials not naturally occurring in the reservoir.

An "equivalence ratio" refers to the mass ratio of fuel to oxygen entering a combustor divided by the mass ratio of fuel to oxygen when the ratio is stoichiometric. A perfect combustion of fuel and oxygen to form carbon dioxide and water would have an equivalence ratio of 1. A too lean mixture, e.g., having more oxygen than fuel, would provide an equivalence ratio less than 1, while a too rich mixture, e.g., having more fuel than oxygen, would provide an equivalence ratio greater than 1.

A "fuel" includes any number of hydrocarbons that may be combusted with an oxidant to power a gas turbine. Such hydrocarbons may include natural gas, treated natural gas, kerosene, gasoline, or any number of other natural or synthetic hydrocarbons. In one embodiment, natural gas from an oil field is purified and used to power the turbine. In another embodiment, a reformed gas, for example, created by processing a hydrocarbon in a steam reforming process may be used to power the turbine.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "gas turbine engine" operates on the Brayton cycle. If the exhaust gas is vented to the atmosphere, this is termed an open Brayton cycle, while recycling of the exhaust gas gives a closed Brayton cycle. As used herein, a "gas turbine" typically includes a compressor section, a number of combustors, and an expander turbine section. The compressor may be used to compress an oxidant, which is mixed with a fuel and channeled to the combustors. The mixture of fuel and oxidant is then ignited to generate hot combustion gases. The combustion gases are channeled to the expander turbine section which extracts energy from the combustion gases for powering the compressor, as well as producing useful work to power a load. In embodiments discussed herein, the oxidant may be provided to the combustors by an external compressor, which may or may not be mechanically linked to the shaft of the gas turbine engine. Further, in embodiments, the compressor section may be used to compress a diluent, such as recycled exhaust gases, which may be fed to the combustors as a coolant.

A "heat exchanger" broadly means any device capable of transferring heat from one media to another media, including particularly any structure, e.g., device commonly referred to as a heat exchanger. Heat exchangers include "direct heat exchangers" and "indirect heat exchangers." Thus, a heat exchanger may be a plate-and-frame, shell-and-tube, spiral, hairpin, core, core-and-kettle, double-pipe or any other type of known heat exchanger. "Heat exchanger" may also refer to any column, tower, unit or other arrangement adapted to allow the passage of one or more streams therethrough, and to affect direct or indirect heat exchange between one or more lines of refrigerant, and one or more feed streams.

A "heat recovery steam generator" or "HRSG" is a heat exchanger or boiler that recovers heat from a hot gas stream. It produces steam that can be used in a process or used to drive a steam turbine. A common application for an HRSG is in a combined-cycle power plant, where hot exhaust from a gas turbine is fed to the HRSG to generate steam which in turn drives a steam turbine. This combination produces electricity more efficiently than either the gas turbine or steam turbine alone.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in raw natural gas, such as $CH_4$, $C_2H_2$, $C_2H_4$, $C_2H_6$, $C_3$ isomers, $C_4$ isomers, benzene, and the like.

"Liquefied natural gas" or "LNG" is natural gas generally known to include a high percentage of methane. However, LNG may also include trace amounts of other compounds. The other elements or compounds may include, but are not limited to, ethane, propane, butane, carbon dioxide, nitrogen, helium, hydrogen sulfide, or combinations thereof, that have been processed to remove one or more components (for instance, helium) or impurities (for instance, water and/or heavy hydrocarbons) and then condensed into a liquid at almost atmospheric pressure by cooling.

"Natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., carbon dioxide or hydrogen sulfide), or any combinations thereof. The natural gas can also contain minor amounts of contaminants such as water, nitrogen, iron sulfide, wax, crude oil, or any combinations thereof. The natural gas stream may be substantially purified prior to use in embodiments, so as to remove compounds that may act as poisons.

An "oxidant" is a gas mixture that can be flowed into the combustors of a gas turbine engine to combust a fuel. As used herein, the oxidant may be oxygen mixed with any number of other gases as diluents, including carbon dioxide ($CO_2$), nitrogen ($N_2$), air, combustion exhaust, and the like. Other gases that function as oxidizers may be present in the oxidant mixture in addition to oxygen, including ozone, hydrogen peroxide, NOxs, and the like.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

A "refrigerant component," in a refrigeration system, will absorb heat at a lower temperature and pressure through evaporation and will reject heat at a higher temperature and pressure through condensation. Illustrative refrigerant components may include, but are not limited to, alkanes, alkenes, and alkynes having one to five carbon atoms, nitrogen, chlorinated hydrocarbons, fluorinated hydrocarbons, other halogenated hydrocarbons, noble gases, and mixtures or combinations thereof.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

Overview

Embodiments described herein provide a system and method for power generation and LNG production. More specifically, embodiments described herein provide a system and method for the integration of low emissions power generation with LNG production. According to such embodiments, a gas mixture including $N_2$ and $CO_2$ is generated from a power plant during the generation of power. A $CO_2$ separation system, such as an amine separation, hot potassium carbonate, solid sorbent or similar system is used to separate the gas mixture into $CO_2$-rich and $CO_2$-lean streams. The $CO_2$-lean stream is primarily nitrogen and may be referred to as a nitrogen stream.

A dehydration system dehydrates the nitrogen stream to generate a nitrogen refrigerant stream, and a refrigeration system produces LNG from a natural gas stream using the nitrogen refrigerant stream. Alternatively, the $CO_2$ separation system may be excluded, and the gas mixture (primarily nitrogen, $CO_2$, and water vapor) may be dehydrated to generate a mixed refrigerant stream. The dehydration is intended to remove sufficient water from the refrigerant stream so that water ice or frost does not form at the cryogenic conditions attained within the refrigeration system. The dehydration system may be a glycol absorption type, membrane type or similar technologies. For a similar reason, the cryogenic temperatures attained by the mixed $CO_2$ and nitrogen refrigerant are limited to avoid dry ice formation. Further processing of a make-up stream to remove $CO_2$ may be performed prior to first fill or replacement of leakages from the refrigeration system.

Systems for Power Generation and LNG Production

FIG. 1 is a block diagram of a system 100 for power generation and LNG production. In the system 100, oxidant 102 and fuel gas 104 are provided to a power plant 106, for example, a gas turbine generator (GTG), at a substantially stoichiometric ratio. The oxidant 102 can be air having about 78% $N_2$ and about 21% oxygen and, thus, the ratio would be calculated between the fuel gas 104 and the oxygen portion of the oxidant 102. The fuel gas 102 and oxygen are substantially completely combusted in the GTG of the power plant 106 to form an exhaust gas that includes $N_2$, $CO_2$, and water ($H_2O$), as well as trace amounts of carbon monoxide (CO), nitrogen oxides (NOx), oxygen ($O_2$), and fuel. The energy from the exhaust gas is used to drive an expander turbine that turns a shaft. A generator coupled to the shaft generates electricity 108.

In some embodiments, the power plant 106 is a semi-closed Brayton cycle power plant. The power plant 106 may be a combined cycle power plant that includes both a semi-closed Brayton cycle and a Rankine cycle. In such embodiments, the exhaust stream from the expander turbine of the semi-closed Brayton cycle can be used to boil water or other heat transfer fluids in a heat recovery steam generator (HRSG) that can be used to power the Rankine cycle power plant. In the Rankine cycle power plant, the steam or other vapor can be used to drive a turbine and generate more electricity 108.

The treated stream from the power plant 106 forms a gas mixture 110. The gas mixture 110 may include $N_2$, $CO_2$, NOx, and any number of other gaseous components. The gas mixture 110 is flowed through a $CO_2$ separation system 112, in which the $CO_2$ 114 is separated from the $N_2$, $H_2O$, and other gaseous components within the gas mixture 110. The NOx may be removed along with the $CO_2$.

The gas mixture 110 is then flowed through a $N_2$ dehydration system 116, in which the $H_2O$ 118 is separated from the $N_2$ and other gaseous components within the gas mixture 110. The dehydration of the gas mixture 110 results in the generation of a nitrogen refrigerant stream 120.

The nitrogen refrigerant stream 120 is flowed through a refrigeration system 122. Within the refrigeration system 122, the nitrogen refrigerant stream 120 is used to cool a natural gas stream 124, producing LNG 126. More specifically, the refrigeration system 122 may include a number of heat exchangers, gas expanders, compressors, pumps, and related equipment, in which the nitrogen refrigerant stream 120 is used to cool the natural gas stream 124 to produce the LNG 126 via indirect heat exchange.

The block diagram of FIG. 1 is not intended to indicate that the system 100 is to include all of the components shown in FIG. 1. Moreover, the system 100 may include any number of additional components not shown in FIG. 1, depending on the details of the specific implementation. For example, in various embodiments, the gas mixture 110 is flowed through a precooler before being flowed through the $CO_2$ separation system 112. The precooler may lower the temperature of the gas mixture 110 in preparation for the utilization of the nitrogen from the gas mixture 110 as a refrigerant in the refrigeration system 122.

Figure 2:
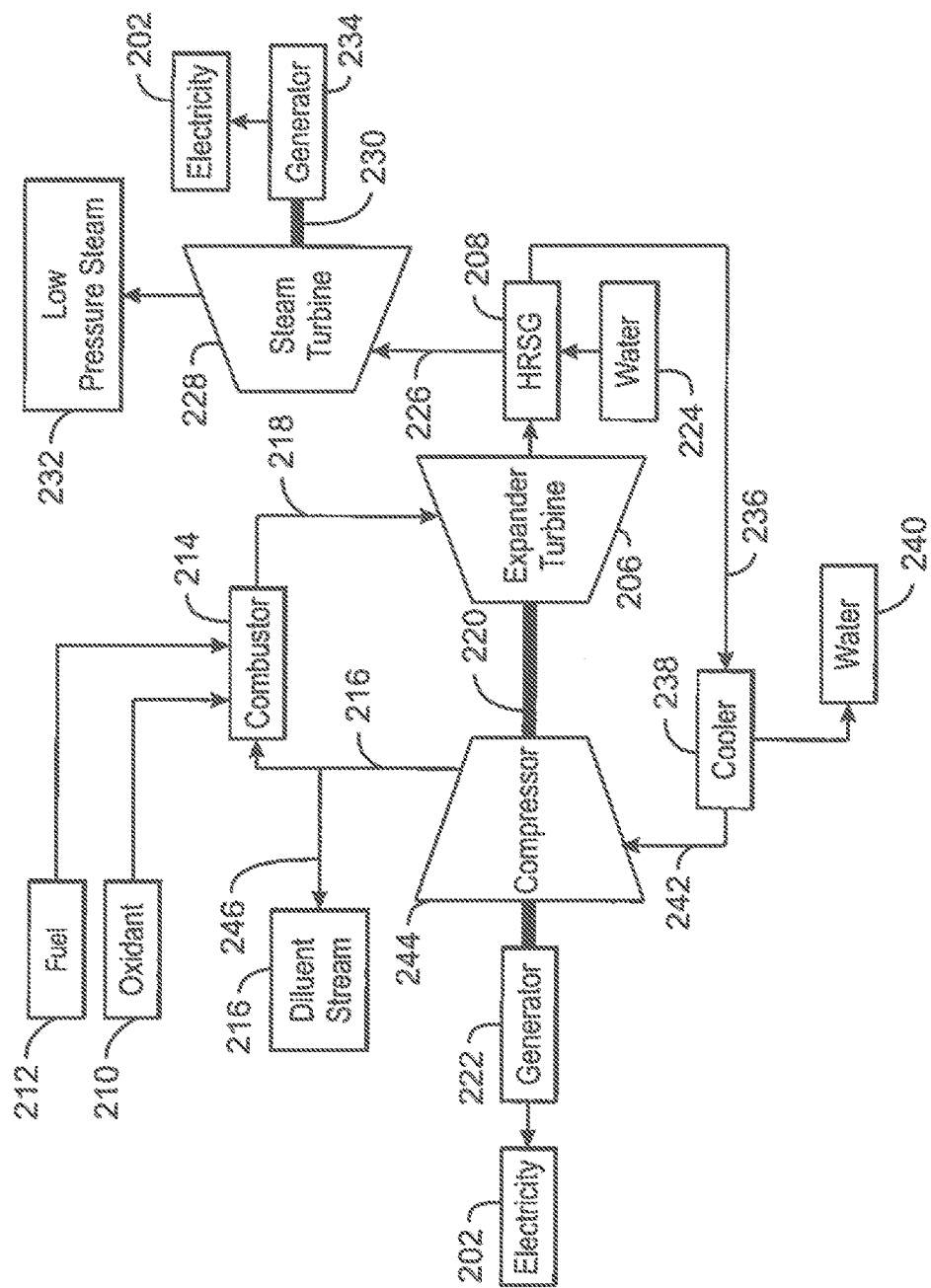
FIG. 2 is a process flow diagram of a combined cycle power plant that can be used to produce electricity and generate a diluent gas mixture including nitrogen ($N_2$) and carbon dioxide ($CO_2$)

FIG. 2 is a process flow diagram of a combined cycle power plant 200 that can be used to produce electricity 202 and generate a diluent gas mixture including $N_2$ and $CO_2$. In various embodiments, the combined cycle power plant 200 includes a semi-closed Brayton cycle including, for example, an expander turbine 206, and a Rankine cycle including, for example, a HRSG 208.

Within the combined cycle power plant 200, oxidant 210 and fuel gas 212 are fed to a combustor 214 to be burned. A compressed diluent stream 216 is also fed to the combustor 214 to dilute the fuel gas 212, oxidant 210 and/or hot exhaust gas 218, which allows the combustion process to be run at near stoichiometric conditions without overheating the combustor 214 or the expander turbine 206. As a result, the amount of $O_2$ and CO generated in the combustion process is decreased, and hot exhaust gas 218 exiting the combustor includes mostly $CO_2$, $H_2O$, and $N_2$, in addition to some trace gases, such as CO and NOx.

The oxidant 210 and fuel gas 212 pressures may be increased, for example, using compressors, to boost the pressure to match the injection pressure of the compressed diluent stream 216 at the combustor 214. The hot exhaust gas 218 from the combustor 214 is flowed to the expander turbine 206, which uses the energy of the hot exhaust gas 218 to spin a shaft 220. The shaft 220 provides mechanical energy to the compressor turbine 224, completing the Brayton cycle. The shaft 220 may also provide mechanical energy to an electric generator 222 to generate electricity 202. The electric generator 222 may be directly coupled to the shaft 220 from the expander turbine 206, or may be coupled to the shaft 220 by a gear box, clutch, or other device.

From the expander turbine 206, the hot exhaust gas 218 is flowed to the HRSG 208. The HRSG 208 may boil a water stream 224 with the energy from the hot exhaust gas 218 to generate steam 226. The steam 226 that is generated can be used to drive a steam turbine 228 and spin a shaft 230. After exiting the steam turbine 228, the resulting low pressure steam 232 can be cooled and condensed, to be used as the water stream 224 to feed the HRSG 208.

The shaft 230 from the steam turbine 228 can provide mechanical energy to an electric generator 234 to generate electricity 202, or may be used power other devices, such as compressors. The electric generator 234 may be directly coupled to the shaft 230 from the steam turbine 228, or may be coupled to the shaft 230 by a gear box, clutch, or other device. Further, in the embodiment shown in FIG. 2, the expander turbine 206 and the steam turbine 228 are coupled to separate electric generators 222 and 234. However, it is to be understood that the expander turbine 206 and the steam turbine 228 may also be coupled, directly or indirectly, to one common electric generator.

The hot gas stream 236 exiting the HRSG 208 is flowed to a cooler 238. The cooler 238 chills the hot gas stream 236, causing the water vapor formed in the combustion process to condense out, allowing its removal as a separate water stream 240. After removal of the water stream 240, the chilled gas mixture 242 is provided to a compressor 244 for recompression, prior to feeding the compressed diluent stream 216 to the combustor 214 to aid in cooling the combustor 214. The recycling of the hot gas stream 236 as the diluent stream 216 partially closes the Brayton cycle in the combined cycle power plant 200, resulting in a semi-closed Brayton cycle.

As the fuel gas 212 and the oxidant 210 are continuously being fed to the combined cycle power plant 200 to maintain the combustion, a portion 246 of the diluent stream 216 is continuously removed. The diluent stream 216 may include $N_2$, $CO_2$, $H_2O$, NOx, and any number of other gaseous components.

According to embodiments described herein, the diluent stream 216 exiting the combined cycle power plant 200 is flowed to an LNG production system (not shown). Within the LNG production system, the diluent stream 216 undergoes $CO_2$ separation and dehydration. The resulting nitrogen stream is then used as a refrigerant to produce LNG from natural gas. The process of producing LNG using the diluent stream 216 is described further with respect to FIGS. 3-6.

The process flow diagram of FIG. 2 is not intended to indicate that the combined cycle power plant 200 is to include all of the components shown in FIG. 2. Moreover, the combined cycle power plant 200 may include any number of additional components not shown in FIG. 2, depending on the details of the specific implementation.

Figure 3:
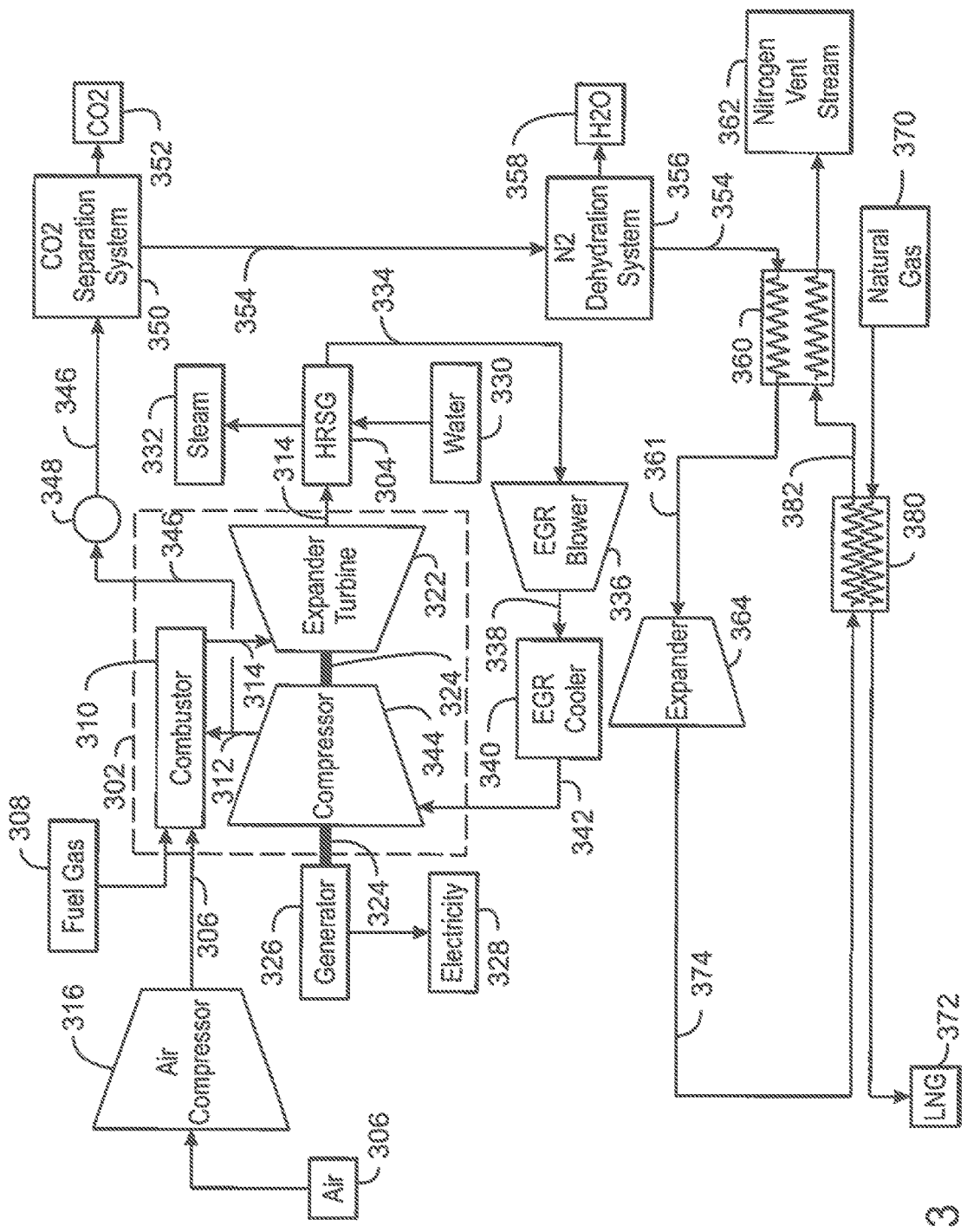
FIG. 3 is a process flow diagram of a system for integrating low emissions power generation with LNG production.

FIG. 3 is a process flow diagram of a system 300 for integrating low emissions power generation with LNG production. The system 300 provides for low emissions power generation using a combined cycle power plant including a semi-closed Brayton cycle that utilizes a gas turbine engine 302 and a Rankine cycle that utilizes an HRSG 304. In addition, the system 300 provides for LNG production by using exhaust gases from the combined cycle power plant as a refrigerant in a refrigeration system.

As shown in FIG. 3, air 306 and fuel gas 308 are fed to a combustor 310 to be burned within the semi-closed Brayton cycle. While air 306 is used as the oxidant in the embodiment shown in FIG. 3, it is to be understood that any other suitable type of oxidant may also be used in conjunction with the system 300.

A compressed diluent stream 312 is also fed to the combustor 310 to dilute the air 306 and/or fuel gas 308 that is utilized for the combustion process and/or the hot exhaust gas 314. This may allow the combustion process to be run at near stoichiometric conditions without overheating. As a result, the amount of $O_2$ and CO generated in the combustion process is decreased, and hot exhaust gas 314 exiting the combustor includes mostly $CO_2$, $H_2O$, and $N_2$, in addition to some trace gases.

The air 306 and fuel gas 308 pressures may be increased, for example, using compressors, to boost the pressure to match the injection pressure of the compressed diluent stream 312 at the combustor 310. For example, according to the embodiment shown in FIG. 3, the air 306 is compressed within an air compressor 316. In addition, the air compressor 316 may include one or more stages of compression, and may include one or more intercoolers to reduce the temperature of the air between stages. Furthermore, when more than one stage of compression is included, the individual stages may or may not be configured in a common casing or driven by a common shaft or other driving means. The compressed air 306 is then fed into the combustor 310 to be burned.

The hot exhaust gas 314 from the combustor 310 is flowed to an expander turbine 322 of the gas turbine engine 302, which uses the energy of the hot exhaust gas 314 to spin a shaft 324. The shaft 324 provides mechanical energy to an electric generator 326 to generate electricity 328. The electric generator 326 may be directly coupled to the shaft 324 from the expander turbine 322, or may be coupled to the shaft 324 by a gear box, clutch, or other device.

From the expander turbine 322, the hot exhaust gas 314 is flowed to the HRSG 304 within the Rankine cycle of the combined cycle power plant. The HRSG 304 boils a water stream 330 to generate steam 332 with the energy from the hot exhaust gas 314. In various embodiments, the generated steam 332 is used to drive the steam turbine, which uses the energy of the steam 332 to spin a shaft. The shaft may provide mechanical energy to an electric generator to generate additional electricity.

The hot gas stream 334 exiting the HRSG 304 is flowed to an exhaust gas recirculation (EGR) blower 336. The EGR blower 336 compresses the hot gas stream 334 and feeds the resulting compressed gas stream 338 into an EGR cooler 340. The EGR cooler 340 chills the compressed gas stream 338, producing a diluent stream 342 and condensed water, not shown.

The diluent stream 342 is then fed into a compressor 344. The compressor 344 compresses the diluent stream 342, producing the compressed diluent stream 312. In the embodiment shown in FIG. 3, the compressor 344 is coupled to the shaft 324, and the mechanical energy provided by the spinning of the shaft 324 is used to drive the compressor 344.

From the compressor 344, the compressed diluent stream 312 is fed to the combustor 310 to aid in cooling the combustor 310. The recycling of the hot gas stream 334 as the compressed diluent stream 312 partially closes the Brayton cycle in the combined cycle power plant, resulting in the semi-closed Brayton cycle.

As the air 306 and the fuel gas 308 are continuously being fed to the combustor 310 to maintain the combustion process, at least a portion of the compressed diluent stream 312 is continuously removed. For example, a portion of the diluent stream 312 may be removed as a gas mixture 346 including $N_2$, $CO_2$, $H_2O$, and any number of other gaseous components.

According to embodiments described herein, the gas mixture 346 may be extracted from the combustor 310 after it has been burned and used to drive the expander turbine 322. For example, the gas mixture 346 may be extracted from the expander turbine 322 at about 2241 kilopascals (kPa) and 427° C. The gas mixture 346 is then cooled using a purge cooler 348 and, optionally, used to generate steam 332 within the HRSG 304.

After the gas mixture 346 has been cooled within the purge cooler 348, the gas mixture 346 is flowed into a $CO_2$ separation system 350. Within the $CO_2$ separation system 350, the gas mixture 346 undergoes a $CO_2$ separation process in which the $CO_2$ is separated from the $N_2$, $H_2O$, and other gaseous components within the gas mixture 346. The $CO_2$ separation process may include an amine separation process, potassium carbonate separation process, or any other suitable type of separation process. The $CO_2$ separation process yields a low pressure $CO_2$ stream 352 and a nitrogen stream 354 at about 2206 kPa and 49° C. The nitrogen stream 354 includes mostly $N_2$, along with $H_2O$ and other trace components, such as argon.

From the $CO_2$ separation system 350, the nitrogen stream 354 is fed into an $N_2$ dehydration system 356. Within the $N_2$ dehydration system 356, the nitrogen stream 354 is dehydrated to remove the $H_2O$ 358. In various embodiments, the nitrogen stream 354 is dehydrated such that there is a very low amount of $H_2O$ 358 remaining in the nitrogen stream 354 to avoid the formation of water ice or frost in the later refrigeration system.

The nitrogen stream 354 is then flowed through a first heat exchanger 360. Within the first heat exchanger 360, the nitrogen stream 354 is pre-chilled to about −54° C., for example, by indirect heat exchange with a nitrogen vent stream 362. The chilled nitrogen stream 361 is flowed through a cryogenic nitrogen expander 364, which reduces the pressure and temperature of the nitrogen stream to form a cryogenic nitrogen stream 374 at about 138 kPa and 163° C., for example, and generates about 28 MW of shaft power that may be used to drive a generator or other mechanical device.

The cryogenic nitrogen stream 374 is flowed through a second heat exchanger 380. Within the second heat exchanger 380, the natural gas stream 370 is de-superheated, condensed, and sub-cooled, producing liquefied natural gas (LNG) stream 372. The second heat exchanger 380 may be referred to as a cold box and may include one or more heat exchangers arranged in series and/or in parallel to optimize the heat transfer from the natural gas stream 370 to the cryogenic nitrogen stream 374.

The nitrogen stream 382 exiting the second heat exchanger 380 is returned to the first heat exchanger 360 to pre-chill the incoming nitrogen stream 354. Upon exiting the first heat exchanger 360, the nitrogen stream 382 is flowed out of the system 300 as the nitrogen vent stream 362.

In various embodiments, the natural gas stream 370 includes mostly methane and is received at about 6895 kPa and 49° C. The natural gas stream 370 may be pre-chilled, condensed, and sub-cooled to about −158° C. in the second heat exchanger 380. The LNG 372 exiting the second heat exchanger 380 may then be flashed to near ambient pressure prior to storage in tankage. In some embodiments, the gas that is flashed off the LNG 372 may be used as a portion of the fuel gas 308 for the gas turbine generator 302.

The process flow diagram of FIG. 3 is not intended to indicate that the system 300 is to include all of the components shown in FIG. 3. Moreover, the system 300 may include any number of additional components not shown in FIG. 3, depending on the details of the specific implementation.

Table 1 lists the properties of the streams flowing through various components of the system 300 of FIG. 3. However, it is to be understood that the streams flowing through the components of the system 300 of FIG. 3 are not limited to the properties shown in Table 1. Rather, the properties shown in Table 1 merely represent one exemplary embodiment of the operation of the system 300 of FIG. 3.

Figure 4:
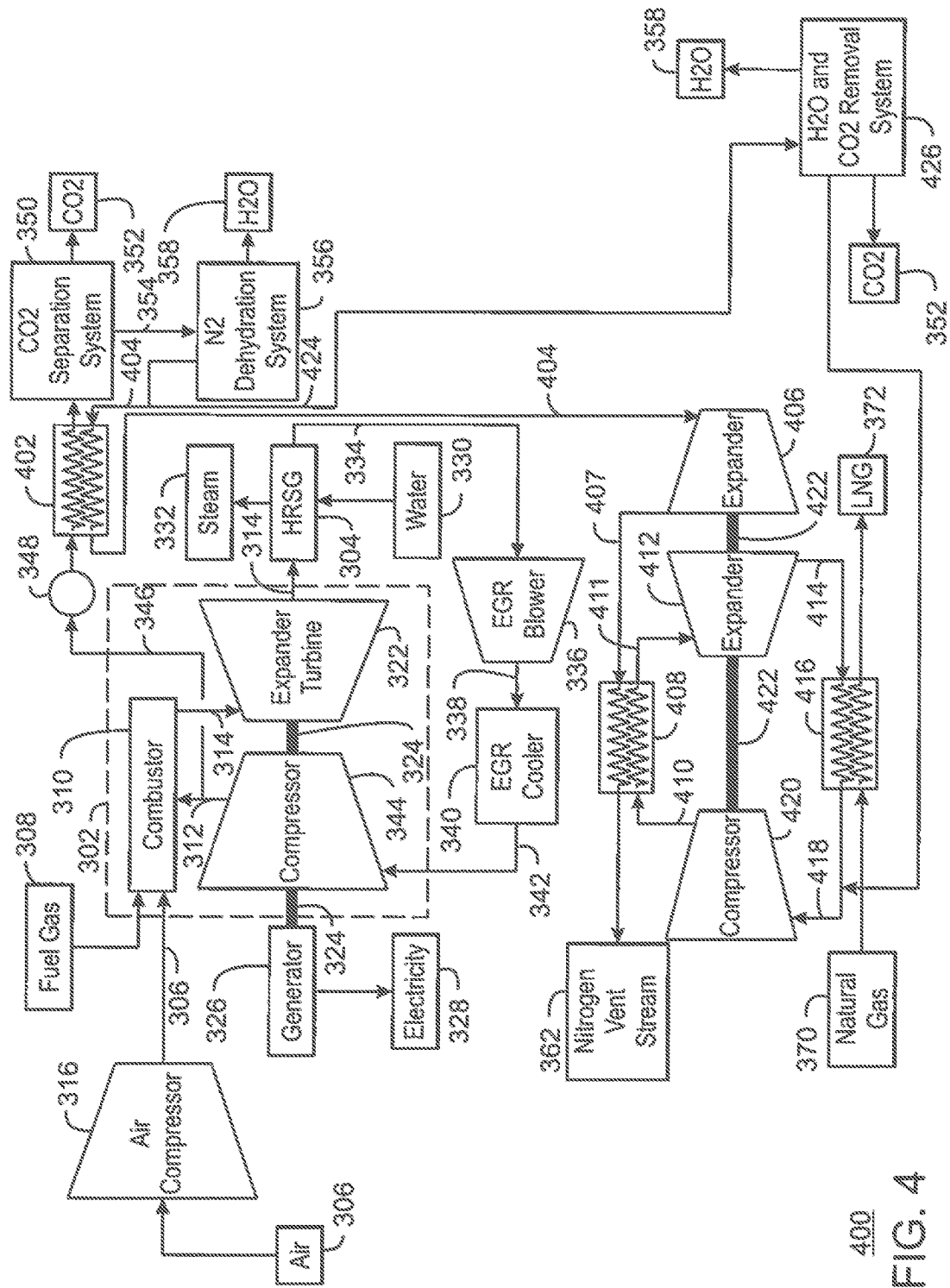
FIG. 4 is a process flow diagram of another system for integrating low emissions power generation with LNG production.

In contrast, according to the system 400 of FIG. 4, the $CO_2$ may be removed to only about 1% by volume of the gas mixture 346, and dehydration of the gas mixture 346 may be performed using routine methods. Thus, the system 400 of FIG. 4 may be capable of producing about 50% more LNG 372 than the system 300 of FIG. 3 at the cost of less power generation.

As shown in FIG. 4, the gas mixture 346 extracted from the combined cycle power plant is cooled within the purge cooler 348. From the purge cooler 348, the gas mixture 346 is passed through a first heat exchanger 402. Within the first heat exchanger 402, the gas mixture 346 is used to heat a portion 404 of the nitrogen stream 354 exiting the $CO_2$ separation system 350.

The nitrogen stream 354 is then flowed through the $N_2$ dehydration system 356. Within the $CO_2$ separation system 350, the $CO_2$ 352 is removed from the gas mixture 346 via an amine separation process, potassium carbonate separation process, or any other suitable type of separation process. The resulting nitrogen stream 354 exiting the $CO_2$ separation system 350 may be at about 2206 kPa and about 49° C.

The nitrogen stream 354 is flowed into the $N_2$ dehydration system 356. Within the $N_2$ dehydration system 356, the nitrogen stream 354 is dehydrated via a conventional dehydration process using triethylene glycol (TEG) or the like. Following dehydration, the portion 404 of the nitrogen stream 354 is heated to about 149° C. within the first heat exchanger 402. The portion 404 of the nitrogen stream 354 is then passed to a first expander 406, which reduces the pressure and temperature of the chilled nitrogen stream 407 to about 138 kPa and −59° C. The chilled nitrogen stream 407 then exchanges heat in a second heat exchanger 408 to pre-chill a recirculated high pressure nitrogen refrigerant stream 410. Following the second heat exchanger 408, the

TABLE 1

Properties of Streams Flowing through Various Components of FIG. 3.

| | Component Number | | | | | | | |
|---|---|---|---|---|---|---|---|---|
| | 354 | 361 | 374 | 364 | 382 | 362 | 370 | 372 |
| Phase | Vapor | Vapor | Vapor | | Vapor | Vapor | Vapor | Liquid |
| Mole flow rate (kmol/sec) | 9.47 | 9.47 | 9.47 | | 9.47 | 9.47 | 2.02 | 2.02 |
| Temperature (deg C.) | 48.9 | −53.8 | −163.4 | | −60.9 | 46.1 | 48.9 | −157.9 |
| Pressure (kPa) | 2206 | 2137 | 138 | | 121 | 103 | 6895 | 6826 |
| External Power Added (MW) | | | | −28.3 | | | | |
| External Heat Added (MW) | | | | | | | | |
| Composition (mole fraction) | | | | | | | | |
| Water | 0.000 | 0.000 | 0.000 | 0.000 | 0.000 | 0.000 | 0.000 | 0.000 |
| Nitrogen | 0.988 | 0.988 | 0.988 | 0.000 | 0.988 | 0.988 | 0.000 | 0.000 |
| CO2 | 0.000 | 0.000 | 0.000 | 0.000 | 0.000 | 0.000 | 0.000 | 0.000 |
| Argon | 0.012 | 0.012 | 0.012 | 0.000 | 0.012 | 0.012 | 0.000 | 0.000 |
| Carbon Monoxide | 0.000 | 0.000 | 0.000 | 0.000 | 0.000 | 0.000 | 0.000 | 0.000 |
| Methane | 0.000 | 0.000 | 0.000 | 0.000 | 0.000 | 0.000 | 1.000 | 1.000 |
| Total | 1.000 | 1.000 | 1.000 | 0.000 | 1.000 | 1.000 | 0.000 | 0.000 |

FIG. 4 is a process flow diagram of another system 400 for integrating low emissions power generation with LNG production. Like numbered items are as described with respect to FIG. 3. The system 400 of FIG. 4 is similar to the system 300 of FIG. 3. However, there are several significant differences between the two systems 300 and 400. Specifically, according to the system 300 of FIG. 3, the gas mixture 346 is treated to remove most of the $CO_2$ 352 and the $H_2O$ 358.

nitrogen stream 407 is vented to the atmosphere as the nitrogen vent stream 362 at about 103 kPa and 35° C.

The recirculated high pressure nitrogen refrigerant stream 410 is flowed out of the second heat exchanger 408 at about 10170 kPa and −51° C. The nitrogen refrigerant stream 411 is then flowed into a second expander 412, which reduces the pressure and temperature of the nitrogen refrigerant stream 411 to about 689 kPa and −166° C. The resulting low pressure cryogenic nitrogen refrigerant stream 414 is passed to a cold box 416. Within the cold box 416, the nitrogen refrigerant stream 414 exchanges heat with the natural gas stream 370, producing the LNG 372.

From the third heat exchanger 416, the resulting warm nitrogen refrigerant stream 418 is flowed into a compressor 420. The compressor 420 compresses the nitrogen refrigerant stream 418 and then passes it back to the second heat exchanger 408 at about 10239 kPa and about 49° C.

In various embodiments, the compressor is coupled to the first expander 406 and the second expander 412 via a shaft 422, and the mechanical energy provided by the spinning of the shaft 422 via the expanders 406 and 412 is used to drive the compressor 412. In some embodiments, gear boxes are positioned between the compressor 412, the first expander 406, and the second expander 412. Such gear boxes may be used to adjust for differing shaft speeds, split the expanders 406 and 412 to individually drive different compressor casings, or add additional drivers, e.g., motors, steam turbines, expander turbines, or the like. In addition, generators may be used to electrically couple the machinery, simplifying the balance of power among the individual machines.

In various embodiments, the nitrogen refrigerant stream 418 is produced from a portion 424 of the nitrogen stream 354 exiting the $N_2$ dehydration system 356. The portion 424 of the nitrogen stream 354 is flowed into an $H_2O$ and $CO_2$ removal system 426. Within the $H_2O$ and $CO_2$ removal system 426, the portion 424 of the nitrogen stream 354 is processed to remove the $CO_2$ and water vapor to a very low level. This may be accomplished using, for example, a methanol extraction process and a molecular sieve water removal process. However, other techniques known to those skilled in the art may also be used for this purpose.

According to the embodiment shown in FIG. 4, the natural gas stream 370 may be received at about 6895 kPa and about 49° C. The natural gas stream 370 may or may not be pre-chilled prior to being flowed into the third heat exchanger 416, depending on the details of the specific implementation. The resulting LNG 372 may exit the third heat exchanger 416 at about 6826 kPa and −155° C., and at a rate of about 1.34 MTonnes/year, e.g., 8000 hours per year. In some embodiments, about 3.6% of the LNG 372 is flashed off in order to bring the LNG 372 to near ambient pressure for storage. The gas that flashes off may be recompressed and used as the fuel gas 308 for the expander turbine 322.

The process flow diagram of FIG. 4 is not intended to indicate that the system 400 is to include all of the components shown in FIG. 4. Moreover, the system 400 may include any number of additional components not shown in FIG. 4, depending on the details of the specific implementation. For example, in some embodiments, the refrigeration loop including the second and third heat exchangers 408 and 416 has a very high operating pressure, e.g., about 31026 kPa.

In some embodiments, auxiliary drivers may be added to the system 400 to increase the power available for the refrigeration system. In addition, one or more supplementary refrigeration loops using nitrogen refrigerants or other refrigerants known to those skilled in the art may be added to the system 400 or to increase the amount of LNG 372 that may be produced by the system 400.

Furthermore, in some embodiments, argon is also removed from the nitrogen stream 354 to provide a substantially pure nitrogen refrigerant stream. The removed argon may then be used as a refrigerant within an additional refrigeration system, for example.

In various embodiments, the temperature of the nitrogen stream 354 exiting the first heat exchanger 402 is adjusted in a range above and below 149° C. Increasing this temperature may increase the amount of power produced by the first expander 406, as well as increase the temperature of the expander effluent that is used to chill the high pressure nitrogen refrigerant stream 410 in the second heat exchanger 408. If an additional refrigeration system is used to further cool the high pressure nitrogen refrigerant stream 410 exiting the second heat exchanger 408, the amount of LNG 372 produced by the system 400 may also be increased.

Tables 2A and 2B list the properties of the streams flowing through various components of the system 400 of FIG. 4. However, it is to be understood that the streams flowing through the components of the system 400 of FIG. 4 are not limited to the properties shown in Tables 2A and 2B. Rather, the properties shown in Tables 2A and 2B merely represent one exemplary embodiment of the operation of the system 400 of FIG. 4.

TABLE 2A

Properties of Streams Flowing through Various Components of FIG. 4.

| | Component Number | | | | | |
|---|---|---|---|---|---|---|
| | 404 | 407 | 406 | 362 | 410 | 411 |
| Phase | Vapor | Vapor | | Vapor | Vapor | Vapor |
| Mole flow rate (kmol/sec) | 9.47 | 9.47 | | 9.47 | 7.39 | 7.39 |
| Temperature (deg C.) | 148.9 | −58.9 | | 35.0 | 48.9 | −50.5 |
| Pressure (kPa) | 2172 | 138 | | 103 | 10239 | 10170 |
| External Power Added (MW) | | | −57.0 | | | |
| External Heat Added (MW) | | | | | | |
| Composition (mole fraction) | | | | | | |
| Water | 0.000 | 0.000 | 0.000 | 0.000 | 0.000 | 0.000 |
| Nitrogen | 0.979 | 0.979 | 0.000 | 0.979 | 0.988 | 0.988 |
| CO2 | 0.010 | 0.010 | 0.000 | 0.010 | 0.000 | 0.000 |
| Argon | 0.012 | 0.012 | 0.000 | 0.012 | 0.012 | 0.012 |

TABLE 2A-continued

Properties of Streams Flowing through Various Components of FIG. 4.

| | Component Number | | | | | |
|---|---|---|---|---|---|---|
| | 404 | 407 | 406 | 362 | 410 | 411 |
| Carbon Monoxide | 0.000 | 0.000 | 0.000 | 0.000 | 0.000 | 0.000 |
| Methane | 0.000 | 0.000 | 0.000 | 0.000 | 0.000 | 0.000 |
| Total | 1.000 | 1.000 | 0.000 | 1.000 | 1.000 | 1.000 |

TABLE 2B

Properties of Streams Flowing through Various Components of FIG. 4.

| | Component Number | | | | | |
|---|---|---|---|---|---|---|
| | 412 | 414 | 418 | 420 | 370 | 372 |
| Phase | | Vapor | Vapor | | Vapor | Liquid |
| Mole flow rate (kmol/sec) | | 7.39 | 7.39 | | 2.90 | 2.90 |
| Temperature (deg C.) | | −165.9 | 13.2 | | 48.9 | −154.8 |
| Pressure (kPa) | | 689 | 669 | | 6826 | 6757 |
| External Power Added (MW) | −19.2 | | | 75.4 | | |
| External Heat Added (MW) | | | | −70.9 | | |
| Composition (mole fraction) | | | | | | |
| Water | 0.000 | 0.000 | 0.000 | 0.000 | 0.000 | 0.000 |
| Nitrogen | 0.000 | 0.988 | 0.988 | 0.000 | 0.000 | 0.000 |
| CO2 | 0.000 | 0.000 | 0.000 | 0.000 | 0.000 | 0.000 |
| Argon | 0.000 | 0.012 | 0.012 | 0.000 | 0.000 | 0.000 |
| Carbon Monoxide | 0.000 | 0.000 | 0.000 | 0.000 | 0.000 | 0.000 |
| Methane | 0.000 | 0.000 | 0.000 | 0.000 | 1.000 | 1.000 |
| Total | 0.000 | 1.000 | 1.000 | 0.000 | 0.000 | 0.000 |

Figure 5:
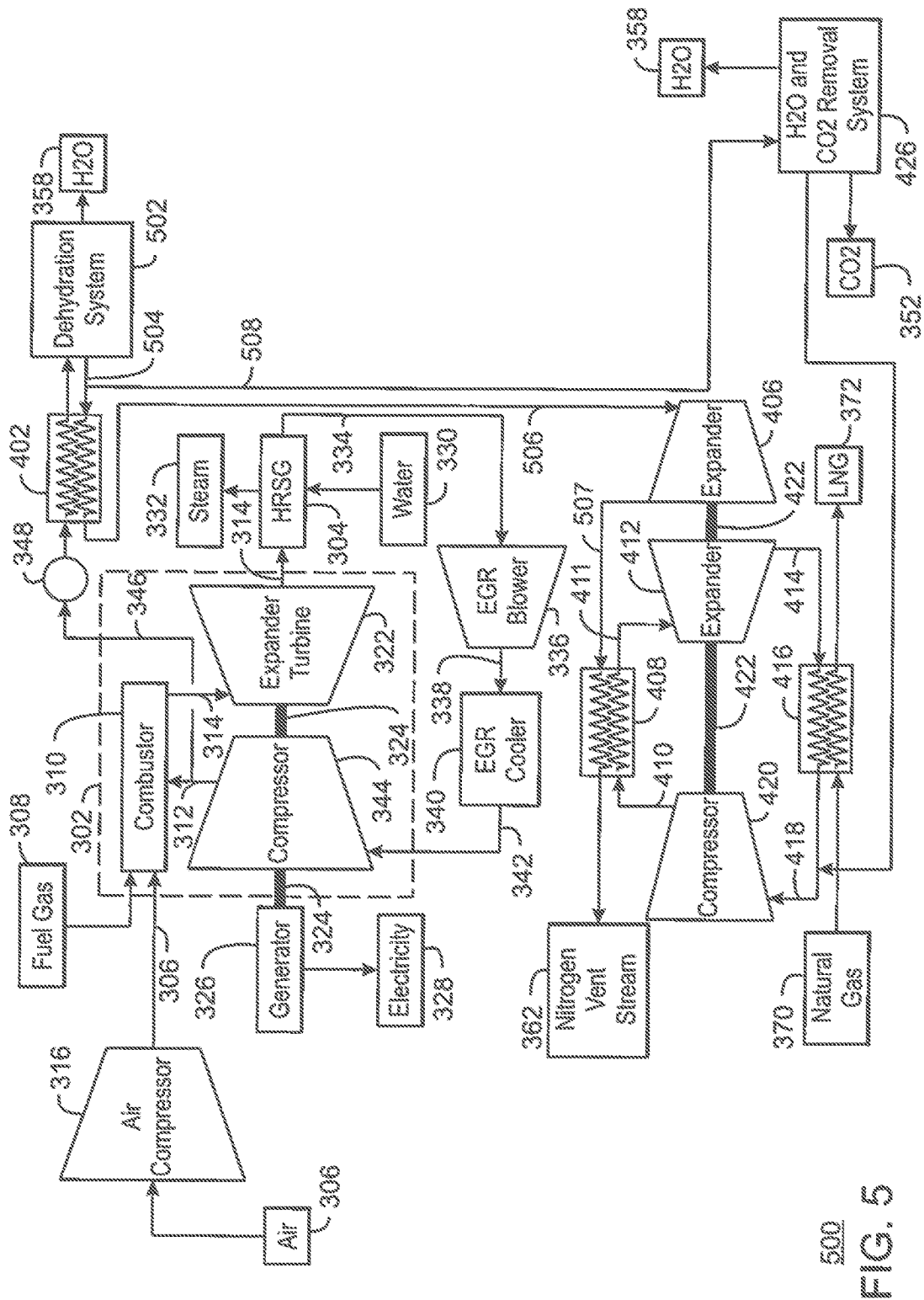
FIG. 5 is a process flow diagram of another system for integrating low emissions power generation with LNG production.

FIG. 5 is a process flow diagram of another system 500 for integrating low emissions power generation with LNG production. Like numbered items are as described with respect to FIGS. 3 and 4. The system of FIG. 5 is similar to the systems 300 and 400 of FIGS. 3 and 4. However, in contrast to the systems 300 and 400 of FIGS. 3 and 4, the system 500 of FIG. 5 does not include the $CO_2$ separation system 350.

As shown in FIG. 5, the gas mixture 346 extracted from the combined cycle power plant is cooled within the purge cooler 348. From the purge cooler 348, the gas mixture 346 is passed through the first heat exchanger 402. The gas mixture 346 is then flowed into a dehydration system 502. Within the dehydration system 502, the gas mixture 346 is dehydrated via a conventional dehydration process using TEG or the like.

A portion 504 of the resulting dehydrated gas mixture 506 is passed through the first heat exchanger 402. Within the first heat exchanger 402, the portion 504 of the dehydrated gas mixture 506 is heated using the gas mixture 346 exiting the purge cooler 348.

The dehydrated gas mixture 506 is then passed to the first expander 406, which reduces the pressure and temperature of the dehydrated gas mixture 506 to about 138 kPa and −62° C. The chilled gas mixture 507 then exchanges heat in the second heat exchanger 408 to pre-chill the recirculated high pressure nitrogen refrigerant stream 410. Following the second heat exchanger 408, the gas mixture 506 is vented to the atmosphere as the nitrogen vent stream 362 at about 103 kPa and 31° C.

The recirculated high pressure nitrogen refrigerant stream 410 exits the second heat exchanger 408 at about 10170 kPa and −54° C. The nitrogen refrigerant stream 411 then enters the second expander 412, which reduces the pressure and temperature of the nitrogen refrigerant stream 411 to about 689 kPa and −168° C. The resulting low pressure cryogenic nitrogen refrigerant stream 414 then passes to a third heat exchanger, or cold box, 416. Within the third heat exchanger 416, the nitrogen refrigerant stream 414 exchanges heat with the natural gas stream 370, producing the LNG 372.

From the third heat exchanger 416, the resulting warm nitrogen refrigerant stream 418 flows into the compressor 420. The compressor 420 compresses the nitrogen refrigerant stream 418 and then passes it back to the second heat exchanger 408 at about 10239 kPa and 49° C.

In various embodiments, the nitrogen refrigerant stream 418 is produced from a remaining portion 508 of the dehydrated gas mixture 506 exiting the dehydration system 502. The remaining portion 508 of the dehydrated gas mixture 506 is flowed into the $H_2O$ and $CO_2$ removal system 426. Within the $H_2O$ and $CO_2$ removal system 426, the portion 508 of the dehydrated gas mixture 506 is processed to remove the $CO_2$ and water vapor to a very low level. This may be accomplished using, for example, a methanol extraction process and a molecular sieve water removal process. However, other techniques known to those skilled in the art may also be used for this purpose.

According to the embodiment shown in FIG. 5, the natural gas stream 370 may be received at about 6895 kPa and 49° C. The natural gas stream 370 may or may not be pre-chilled prior to being flowed into the third heat exchanger 416, depending on the details of the specific implementation. The resulting LNG 372 may exit the third heat exchanger 416 at about 6826 kPa and −157° C., and at a rate of about 1.46 MTonnes/year, e.g., 8000 hours per year. In some embodiments, about 2.4% of the LNG 372 is flashed off in order to bring the LNG 372 to near ambient pressure for storage. The gas that flashes off may be recompressed and used as the fuel gas 308 for the expander turbine 322.

The process flow diagram of FIG. 5 is not intended to indicate that the system 500 is to include all of the components shown in FIG. 5. Moreover, the system 500 may include any number of additional components not shown in FIG. 5, depending on the details of the specific implementation. For example, as discussed with respect to FIG. 4, the refrigeration loop including the second and third heat exchangers 408 and 416 may have a very high operating pressure, e.g., about 31,026 kPa.

Tables 3A and 3B list the properties of the streams flowing through various components of the system 500 of FIG. 5. However, it is to be understood that the streams flowing through the components of the system 500 of FIG. 5 are not limited to the properties shown in Tables 3A and 3B. Rather, the properties shown in Tables 3A and 3B merely represent one exemplary embodiment of the operation of the system 500 of FIG. 5.

TABLE 3A

Properties of Streams Flowing through Various Components of FIG. 5.

| | Component Number | | | | | |
|---|---|---|---|---|---|---|
| | 506 | 507 | 406 | 362 | 410 | 411 |
| Phase | Vapor | Vapor | | Vapor | Vapor | Vapor |
| Mole flow rate (kmol/sec) | 10.74 | 10.74 | | 10.74 | 8.19 | 8.19 |
| Temperature (deg C.) | 135.0 | −62.3 | | 30.8 | 48.9 | −53.9 |
| Pressure (kPa) | 2172 | 138 | | 103 | 10239 | 10170 |
| External Power Added (MW) | | | −63.0 | | | |
| External Heat Added (MW) | | | | | | |
| Composition (mole fraction) | | | | | | |
| Water | 0.000 | 0.000 | | 0.000 | 0.000 | 0.000 |
| Nitrogen | 0.870 | 0.870 | | 0.870 | 0.988 | 0.988 |
| CO2 | 0.119 | 0.119 | | 0.119 | 0.000 | 0.000 |
| Argon | 0.010 | 0.010 | | 0.010 | 0.012 | 0.012 |
| Carbon Monoxide | 0.001 | 0.001 | | 0.001 | 0.000 | 0.000 |
| Methane | 0.000 | 0.000 | | 0.000 | 0.000 | 0.000 |
| Total | 1.000 | 1.000 | | 1.000 | 1.000 | 1.000 |

TABLE 3B

Properties of Streams Flowing through Various Components of FIG. 5.

| | Component Number | | | | | |
|---|---|---|---|---|---|---|
| | 412 | 414 | 418 | 420 | 370 | 372 |
| Phase | | Vapor | Vapor | | Vapor | Liquid |
| Mole flow rate (kmol/sec) | | 8.19 | 8.19 | | 3.15 | 3.15 |
| Temperature (deg C.) | | −167.8 | 8.4 | | 48.9 | −156.7 |
| Pressure (kPa) | | 689 | 669 | | 6826 | 6757 |
| External Power Added (MW) | −20.7 | | | 82.9 | | |
| External Heat Added (MW) | | | | −76.8 | | |
| Composition (mole fraction) | | | | | | |
| Water | | 0.000 | 0.000 | | 0.000 | 0.000 |
| Nitrogen | | 0.988 | 0.988 | | 0.000 | 0.000 |
| CO2 | | 0.000 | 0.000 | | 0.000 | 0.000 |
| Argon | | 0.012 | 0.012 | | 0.000 | 0.000 |
| Carbon Monoxide | | 0.000 | 0.000 | | 0.000 | 0.000 |
| Methane | | 0.000 | 0.000 | | 1.000 | 1.000 |
| Total | | 1.000 | 1.000 | | 0.000 | 0.000 |

Method for Power Generation and LNG Production

Figure 6:
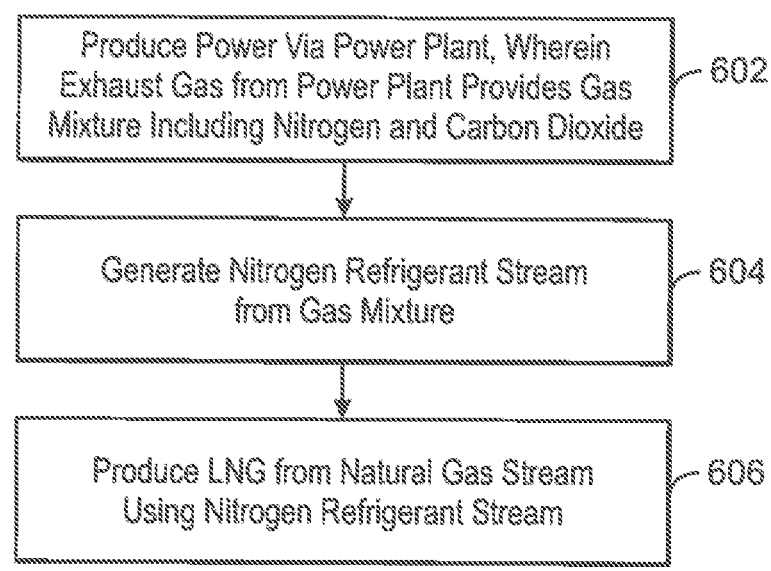
FIG. 6 is a process flow diagram of a method for power generation and LNG production.

FIG. 6 is a process flow diagram of a method 600 for power generation and LNG production. The method 600 may be implemented by any of the systems 100-500 described with respect to FIGS. 1-5. Moreover, the method 600 may be implemented by any variation of the systems 100-500 described with respect to FIGS. 1-5, or any suitable alternative system that is capable of integrating power generation with LNG production.

The method 600 begins at block 602, at which power is produced via a power plant. An exhaust gas from the power plant provides a gas mixture including nitrogen and carbon dioxide. The gas mixture may also include argon and any number of other trace gases.

In various embodiments, producing power via the power plant includes providing mechanical energy via an expander turbine of a gas turbine engine using energy extracted from the gas mixture after combustion of the gas mixture in a combustor and generating electricity via a generator using the mechanical energy provided by the expander turbine. Further, in various embodiments, producing power via the power plant also includes generating steam via a HRSG by heating a boiler with an exhaust stream from the expander turbine, providing mechanical energy via a steam turbine using energy extracted from the steam generated by the HRSG, and generating electricity via a generator using the mechanical energy provided by the steam turbine. In some embodiments, one common generator is used to generate electricity from the mechanical energy provided by the expander turbine and the steam turbine, while, in other embodiments, separate generators are used.

At block 604, a nitrogen refrigerant stream is generated from the gas mixture. Generating the nitrogen refrigerant stream may include cooling the gas mixture using a purge cooler as the gas mixture exits the combustor, for example, and dehydrating the gas mixture within a dehydration system. In various embodiments, generating the nitrogen refrigerant stream also includes separating the carbon dioxide from the gas mixture within a carbon dioxide separation system.

At block 606, LNG is produced from a natural gas stream using the nitrogen refrigerant stream. More specifically, the LNG may be produced from the natural gas stream by cooling the natural gas stream via heat exchange with the nitrogen refrigerant stream. This may be accomplished using a refrigeration system. In some embodiments, the refrigeration system includes a number of heat exchangers configured to chill the natural gas stream to produce the LNG via indirect heat exchange with the nitrogen refrigerant stream.

In other embodiments, the refrigeration system includes a nitrogen refrigeration loop. The nitrogen refrigeration loop may include a first heat exchanger configured to cool the nitrogen refrigerant stream and an expander configured to reduce a temperature and a pressure of the nitrogen refrigerant stream. The nitrogen refrigeration loop may also include a second heat exchanger configured to produce the LNG via indirect heat exchange between the nitrogen refrigerant stream and the natural gas stream and a compressor configured to compress the nitrogen refrigerant stream and pass the nitrogen refrigerant stream back to the first heat exchanger. According to such embodiments, a portion of the nitrogen refrigerant stream from the dehydration system may be used as the nitrogen refrigerant stream for the nitrogen refrigeration loop, and a remaining portion of the nitrogen refrigerant stream from the dehydration system may be used to cool the portion of the nitrogen refrigerant stream in the first heat exchanger.

The process flow diagram of FIG. 6 is not intended to indicate that the steps of the method 600 are to be executed in any particular order, or that all of the steps of the method 600 are to be included in every case. Further, any number of additional steps may be included within the method 600, depending on the details of the specific implementation.

What is claimed is:

1. A system for generating power and producing liquefied natural gas (LNG), comprising:
    a power plant configured to generate power, wherein an exhaust gas from the power plant provides a gas mixture comprising nitrogen and carbon dioxide;
    a dehydration system configured to dehydrate the gas mixture to generate a nitrogen refrigerant stream; and
    a refrigeration system configured to produce LNG from a natural gas stream using the nitrogen refrigerant stream.

2. The system of claim 1, comprising a carbon dioxide separation system configured to separate the carbon dioxide from the gas mixture.

3. The system of claim 2, wherein the carbon dioxide separation system separates the carbon dioxide from the gas mixture via an amine separation process.

4. The system of claim 2, wherein the carbon dioxide separation system separates the carbon dioxide from the gas mixture via a potassium carbonate separation process.

5. The system of claim 1, wherein the power plant comprises:
    an expander turbine configured to provide mechanical energy by extracting energy from the gas mixture after combustion of the gas mixture in a combustor; and
    a generator configured to generate electricity from the mechanical energy provided by the expander turbine.

6. The system of claim 1, wherein the power plant comprises a combined cycle power plant.

7. The system of claim 6, wherein the combined cycle power plant comprises:
    an expander turbine configured to provide mechanical energy by extracting energy from the gas mixture after combustion of the gas mixture in a combustor;
    a heat recovery steam generator (HRSG) configured to generate steam by heating a boiler with an exhaust stream from the expander turbine;
    a steam turbine configured to provide mechanical energy by extracting energy from the steam generated by the HRSG; and
    a generator configured to generate electricity from the mechanical energy provided by the expander turbine and the steam turbine.

8. The system of claim 6, wherein the combined cycle power plant comprises:
    an expander turbine configured to provide mechanical energy by extracting energy from the gas mixture after combustion of the gas mixture in a combustor;
    a first generator configured to generate electricity from the mechanical energy provided by the expander turbine;
    a heat recovery steam generator (HRSG) configured to generate steam by heating a boiler with an exhaust stream from the expander turbine;
    a steam turbine configured to provide mechanical energy by extracting energy from the steam generated by the HRSG; and
    a second generator configured to generate electricity from the mechanical energy provided by the steam turbine.

9. The system of claim 1, wherein a portion of the gas mixture is recycled to the power plant.

10. The system of claim 1, wherein the refrigeration system comprises a plurality of heat exchangers configured to chill the natural gas stream to produce the LNG via indirect heat exchange with the nitrogen refrigerant stream.

11. The system of claim 1, wherein the refrigeration system comprises a nitrogen refrigeration loop.

12. The system of claim 11, wherein the nitrogen refrigeration loop comprises:
a first heat exchanger configured to cool the nitrogen refrigerant stream;
an expander configured to reduce a temperature and a pressure of the nitrogen refrigerant stream;
a second heat exchanger configured to produce the LNG via indirect heat exchange between the nitrogen refrigerant stream and the natural gas stream; and
a compressor configured to compress the nitrogen refrigerant stream and pass the nitrogen refrigerant stream back to the first heat exchanger.

13. The system of claim 12, wherein a first portion of the nitrogen refrigerant stream from the dehydration system is used as the nitrogen refrigerant stream for the nitrogen refrigeration loop, and wherein a second portion of the nitrogen refrigerant stream from the dehydration system is used to cool the first portion of the nitrogen refrigerant stream in the first heat exchanger.

14. The system of claim 13, wherein the first portion of the nitrogen refrigerant stream is flowed from the dehydration system to a water and carbon dioxide removal system prior to being flowed to the nitrogen refrigeration loop.

15. The system of claim 13, wherein the second portion of the nitrogen refrigerant stream is flowed from the dehydration system to a third heat exchanger and a second expander prior to being flowed to the first heat exchanger.

16. The system of claim 1, wherein the power plant is configured to operate at a substantially stoichiometrically balanced condition, and wherein at least a portion of the exhaust gas is recirculated to the power plant.

17. A method for generating power and producing liquefied natural gas (LNG), comprising:
producing power via a power plant, wherein an exhaust gas from the power plant provides a gas mixture comprising nitrogen and carbon dioxide;
generating a nitrogen refrigerant stream from the gas mixture; and
producing LNG from a natural gas stream using the nitrogen refrigerant stream.

18. The method of claim 17, comprising generating the nitrogen refrigerant stream by dehydrating the gas mixture.

19. The method of claim 17, comprising generating the nitrogen refrigerant stream by removing the carbon dioxide from the gas mixture.

20. The method of claim 17, comprising generating the nitrogen refrigerant stream by removing argon from the gas mixture.

21. The method of claim 17, comprising generating the nitrogen refrigerant stream by cooling the gas mixture.

22. The method of claim 17, wherein producing the power via the power plant comprises:
providing mechanical energy via an expander turbine using energy extracted from the gas mixture after combustion of the gas mixture in a combustor; and
generating electricity via a generator using the mechanical energy provided by the expander turbine.

23. The method of claim 17, wherein producing the power via the power plant comprises:
providing mechanical energy via an expander turbine using energy extracted from the gas mixture after combustion of the gas mixture in a combustor;
generating steam via a heat recovery steam generator (HRSG) by heating a boiler with an exhaust stream from the expander turbine;
providing mechanical energy via a steam turbine using energy extracted from the steam generated by the HRSG; and
generating electricity via a generator using the mechanical energy provided by the expander turbine and the steam turbine.

24. The method of claim 17, comprising producing the LNG from the natural gas stream by cooling the natural gas stream via heat exchange with the nitrogen refrigerant stream.

25. A system for producing liquefied natural gas (LNG) using nitrogen recovered from a combined cycle power plant, comprising:
an expander turbine configured to provide mechanical energy by extracting energy from a gas mixture exiting a combustor, wherein the gas mixture comprises nitrogen and carbon dioxide;
a heat recovery steam generator (HRSG) configured to generate steam by heating a boiler with the gas mixture from the expander turbine;
a steam turbine configured to provide mechanical energy by extracting energy from the steam generated by the HRSG;
a generator configured to generate electricity from the mechanical energy provided by the expander turbine and the steam turbine;
a dehydration system configured to dehydrate the gas mixture, generating a nitrogen refrigerant stream; and
a refrigeration system configured to produce LNG from a natural gas stream using the nitrogen refrigerant stream.

26. The system of claim 25, comprising a carbon dioxide separation system configured to separate the carbon dioxide from the nitrogen refrigerant stream.

27. The system of claim 25, comprising a precooler configured to chill the gas mixture before dehydration of the gas mixture in the dehydration system.

28. The system of claim 25, wherein the refrigeration system comprises a plurality of heat exchangers configured to cool the natural gas stream to produce the LNG via indirect heat exchange with the nitrogen refrigerant stream.

29. The system of claim 25, wherein the refrigeration system comprises a nitrogen refrigeration loop configured to cool the natural gas stream to produce the LNG via indirect heat exchange with the nitrogen refrigerant stream as the nitrogen refrigerant stream circulates through the nitrogen refrigeration loop.

30. The system of claim 25, wherein the expander turbine is configured to operate at a substantially stoichiometrically balanced condition, and wherein at least a portion of the gas mixture is recirculated to the combustor.

* * * * *